(12) United States Patent
Chumokhvalov et al.

(10) Patent No.: US 11,378,126 B2
(45) Date of Patent: Jul. 5, 2022

(54) BEARING ASSEMBLY

(71) Applicants: Andrey M. Chumokhvalov, St. Petersburg (RU); Victor S. Lisitsin, St. Petersburg (RU)

(72) Inventors: Andrey M. Chumokhvalov, St. Petersburg (RU); Victor S. Lisitsin, St. Petersburg (RU)

(73) Assignees: Andrey M. Chumokhvalov, St. Petersburg (RU); Alexey E. Tarasenko, Moscow (RU)

( * ) Notice: Subject to any disclaimer, the term of this patent is extended or adjusted under 35 U.S.C. 154(b) by 0 days.

(21) Appl. No.: 14/147,784

(22) Filed: Jan. 6, 2014

(65) Prior Publication Data

US 2014/0119684 A1   May 1, 2014

Related U.S. Application Data

(63) Continuation of application No. PCT/RU2012/000582, filed on Jul. 12, 2012.

(30) Foreign Application Priority Data

Jul. 19, 2011   (RU) ............................ RU2011130763

(51) Int. Cl.
*F16C 19/54*   (2006.01)
*F16C 33/38*   (2006.01)
(Continued)

(52) U.S. Cl.
CPC .............. *F16C 33/49* (2013.01); *F16C 19/54* (2013.01); *F16C 33/3887* (2013.01);
(Continued)

(58) Field of Classification Search
CPC .... F16C 33/6651; F16C 19/54; F16C 33/491; F16C 2300/22; F16C 33/6659;
(Continued)

(56) References Cited

U.S. PATENT DOCUMENTS 715,779 A * 12/1902 Fraser .................... F16C 33/40
                                                    384/533
2,611,670 A *  9/1952 Palmgren ...................... 384/577
(Continued)

FOREIGN PATENT DOCUMENTS

DE         3911670 A1    10/1990
DE    19818634 A1 * 11/1999 ............ F16C 19/546
(Continued)

OTHER PUBLICATIONS

International Search Report for International Application No. PCT/RU2012/000582 filed Jul. 12, 2012, dated Dec. 6, 2012.
(Continued)

*Primary Examiner* — Phillip A Johnson
(74) *Attorney, Agent, or Firm* — Patentagar PLLC; Alexander Rabinovich

(57) ABSTRACT

The rolling bearing design incorporates at least two anti-friction bearings, a fixed supporting centering sleeve and a toothed cage with an extended cylindrical part, extending outside the dimensions of the bearings, and sockets in the form of a crown on both sides of the cylindrical part of the cage. The fixed supporting centering sleeve of the cage incorporates channels for oil supply to the cage. The extended cylindrical part of the cage between the adjacent bearings in the assembly can be made up of two parts with the possibility to slip relative to each other. The invention enables improvement in the reliability, wear-resistance and durability of the bearing assemblies incorporating at least two bearings, including those of different types and sizes, which operate at high speeds and are subject to significant centrifugal loads exceeding the gravity acceleration by hundred times.

4 Claims, 4 Drawing Sheets

(51) Int. Cl.
*F16C 33/49* (2006.01)
*F16C 33/48* (2006.01)
*F16C 33/66* (2006.01)
*F16C 33/41* (2006.01)
*F16C 33/46* (2006.01)
*F16C 35/06* (2006.01)
*F16C 19/56* (2006.01)

(52) U.S. Cl.
CPC ............ *F16C 33/41* (2013.01); *F16C 33/467* (2013.01); *F16C 33/48* (2013.01); *F16C 33/66* (2013.01); *F16C 33/6659* (2013.01); *F16C 19/56* (2013.01); *F16C 35/061* (2013.01)

(58) Field of Classification Search
CPC ...... F16C 33/66; F16C 33/48; F16C 33/3887; F16C 33/467; F16C 33/41; F16C 19/546; F16C 19/547; F16C 19/56; F16C 33/306; F16C 33/3806; F16C 33/40; F16C 33/405; F16C 33/4605; F16C 33/483; F16C 35/061
USPC ....... 384/470, 513, 523, 550, 551, 554, 555, 384/560, 569, 572
See application file for complete search history.

(56) References Cited

U.S. PATENT DOCUMENTS

| | | | |
|---|---|---|---|
| 3,290,102 A * | 12/1966 | Eriksson et al. | 384/577 |
| 3,913,993 A * | 10/1975 | Ernst | 384/513 |
| 4,657,413 A | 4/1987 | Hasegawa | |
| 4,787,757 A * | 11/1988 | Finger | 384/470 |
| 5,547,060 A * | 8/1996 | Giese | F16C 19/48 192/110 B |
| 6,042,273 A * | 3/2000 | Thrasher | F16C 25/08 384/517 |
| 7,220,059 B2 * | 5/2007 | Gobel et al. | 384/551 |
| 8,007,183 B2 * | 8/2011 | Ansorge et al. | 384/551 |
| 2004/0208410 A1 * | 10/2004 | Kuwajima | F16C 33/414 384/504 |
| 2012/0219247 A1 * | 8/2012 | Bettenhausen et al. | 384/492 |
| 2014/0254969 A1 * | 9/2014 | Caspall | 384/560 |

FOREIGN PATENT DOCUMENTS

| | | | | |
|---|---|---|---|---|
| GB | 2051971 A | * | 1/1981 | |
| JP | 0361775 Y2 | | 11/1949 | |
| JP | S36-002609 Y2 | | 2/1961 | |
| JP | 61-065906 A | | 4/1986 | |
| JP | 2001-304271 A | | 10/2001 | |
| JP | 2007-502953 A | | 2/2007 | |
| JP | 2014066348 A | * | 4/2014 | F16C 33/80 |
| RU | 2401953 C1 | | 10/2010 | |
| SU | 176468 | | 1/1966 | |
| SU | 1328595 A1 | | 8/1987 | |
| WO | WO-2015129826 A1 | * | 9/2015 | B23Q 11/127 |

OTHER PUBLICATIONS

Office Action from the Japanese counterpart Application No. JP2014-521589, dated Jan. 6, 2015.

* cited by examiner

BEARING ASSEMBLY

RELATED APPLICATIONS

This Application is a National phase application of International Application PCT/RU2012/000582, filed on Jul. 12, 2012, which in turn claims priority to Russian Patent Applications No. RU2011130763, filed Jul. 19, 2011, both of which are incorporated herein by reference in their entirety.

FIELD OF THE INVENTION

The invention pertains to machine engineering and can be used in assemblies, where high speed antifriction bearings are used bearing, particularly in planetary mills, planetary reduction gears, and planetary gearboxes, i.e., where the bearings are subject to significant centrifugal loads exceeding the gravity acceleration by hundred times.

BACKGROUND OF THE INVENTION

A bearing assembly incorporating a rolling bearing; cage with an extended part extending outside the bearing; sleeve with a collar enclosing the extended part of the cage; and a cavity for bearing lubrication has been known (see inventor's certificate of the USSR No. 1328595 dd. Jun. 13, 1984).

The possibility of misalignment may be reckoned among the deficiencies of the said assembly, which is explained by the inequality of friction forces occurring at the different locations, where the cage is in contact with the other assembly components. With high centrifugal overloads, it can lead to overheating and seizure of the bearing.

The roller bearing as per inventor's certificate of the USSR No. 176468 dd. Mar. 20, 1963, which incorporates an outer ring; inner ring, installed on the working shaft; and a toothed cage in the form of a sleeve with the teeth on one end, the second end of which is freely mounted on the working shaft or the extended part of the inner ring, can be considered as a technical solution, which is the closest to the applied invention.

The deficiencies of this solution are the asymmetry of the design and lack of the bearing lubrication system, which together lead to misalignment and seizure of the bearing.

Rotational speed of the high-speed rolling bearings is that high that the inertial forces of the cage and rolling elements as well as the friction forces in the grease cause the slipping of the rolling elements in the bearing race. In the bearing assemblies incorporating two and more rolling bearings, the non-uniform slippage of the rolling elements is the cause of increased wear of the separating part of the cage and bearing races and can lead to misalignment and seizure of the bearing.

SUMMARY OF THE INVENTION

The proposed antifriction design of the bearing assembly enables improvement in its reliability, wear-resistance and durability.

The set task is resolved with a bearing assembly, incorporating at least two rolling bearings, a toothed cage extending beyond the dimensions of the bearings, and a fixed supporting centering sleeve, where the sockets for rolling elements are made in both sides of the cylindrical part of the cage.

The fixed supporting centering sleeve of the cage, which location depends on the assembly loading conditions, can be located both inside and outside of the extended cylindrical part (FIG. 1) and has channels for oil supply to the cage.

Further, the extended cylindrical body of the toothed cage between the adjacent bearings in the assembly can be made up of two portions with the possibility of skidding relative to each other.

The location of the sockets for rolling elements on both sides of the cylindrical part of the cage enabled elimination of the misalignments in the design; the channels for oil supply into the clearance between the cylindrical part of the cage and the fixed supporting centering sleeve enabled reduction in the friction and thus improvement in the wear-resistance of the assembly parts as much as possible; and the two-part design of the cage enabled reduction in the negative effect of the difference in the slippage velocity of the rolling elements in the left and right bearings, which is particularly evident at high rotational speeds of the bearings, and thus improvement in the durability of the assembly.

BRIEF DESCRIPTION OF THE DRAWINGS

The essence of the proposed bearing assembly is explained in FIGS. 1, 2, 3, and 4, which show the axonometry and longitudinal section of the assembly, and the developed view of the joint of the cages.

DETAILED DESCRIPTION OF THE PREFERRED EMBODIMENTS

Figure 1:
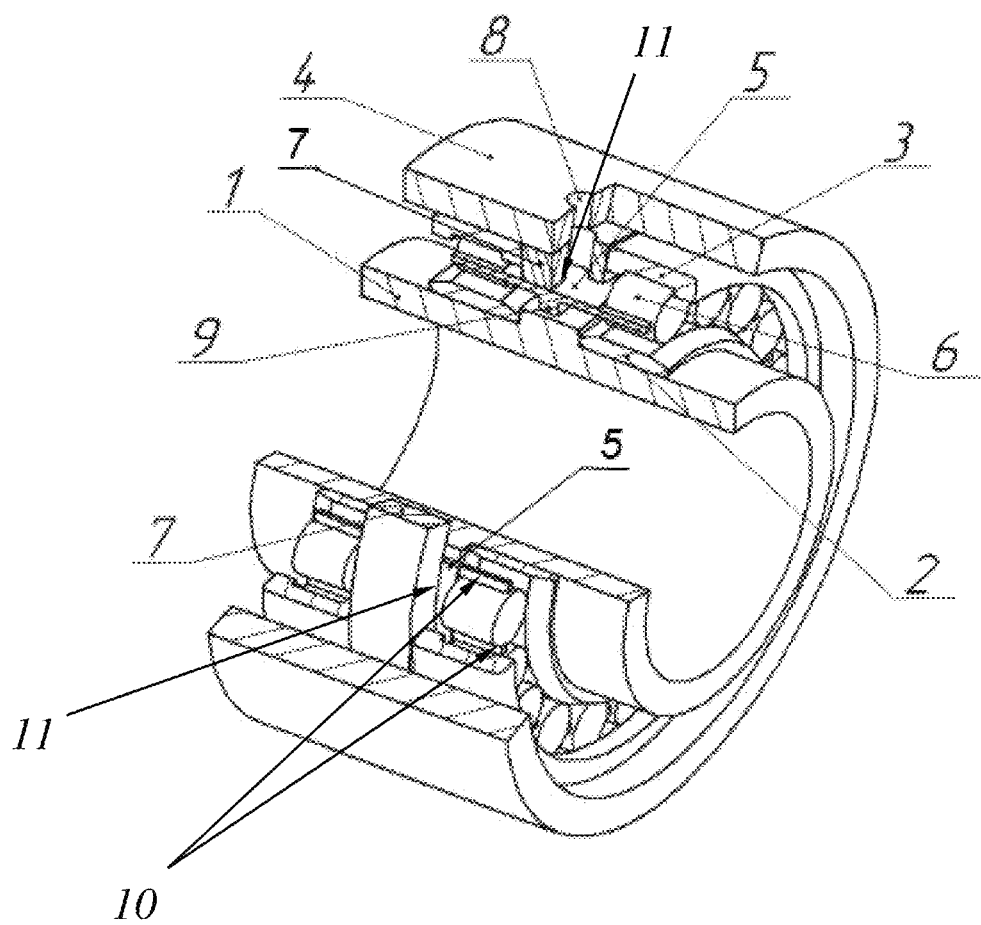

The bearing assembly according to one of the embodiments of the present invention shown in FIG. 1 incorporates two rolling bearings, each comprising an inner ring 2 mounted on shaft 1, an outer ring 3 fixed in a case 4, and rolling elements 6 between the rings 2 and 3, and also comprising a toothed cage 5 in direct contact with the rolling elements 6.

The cage is made in the form of a hollow cylinder extending outside the bearing axial dimension, the ends of the cylinder being made in the form of a crown with the sockets 10 for receiving rolling elements. The cage 5 is supported by a fixed supporting centering sleeve 7 made, or mounted, on the shaft 1 or made, or mounted, in the case 4, depending on the bearing assembly operation. As illustrated by FIG. 1, the fixed supporting centering sleeve 7 is located outside of the extended cylinder part of the cage 5.

To supply oil to operating parts, the assembly is provided with channels 8 made in the fixed supporting centering sleeve 7. Provided between the cage 5 and the fixed supporting centering sleeve 7 is a clearance 11 where the oil supplied through the channels 8 is delivered.

To improve the reliability of the design, reinforcement ribs 9 can be made on a portion of the cage cylinder, which is not in contact with the fixed supporting centering sleeve.

Figure 4:
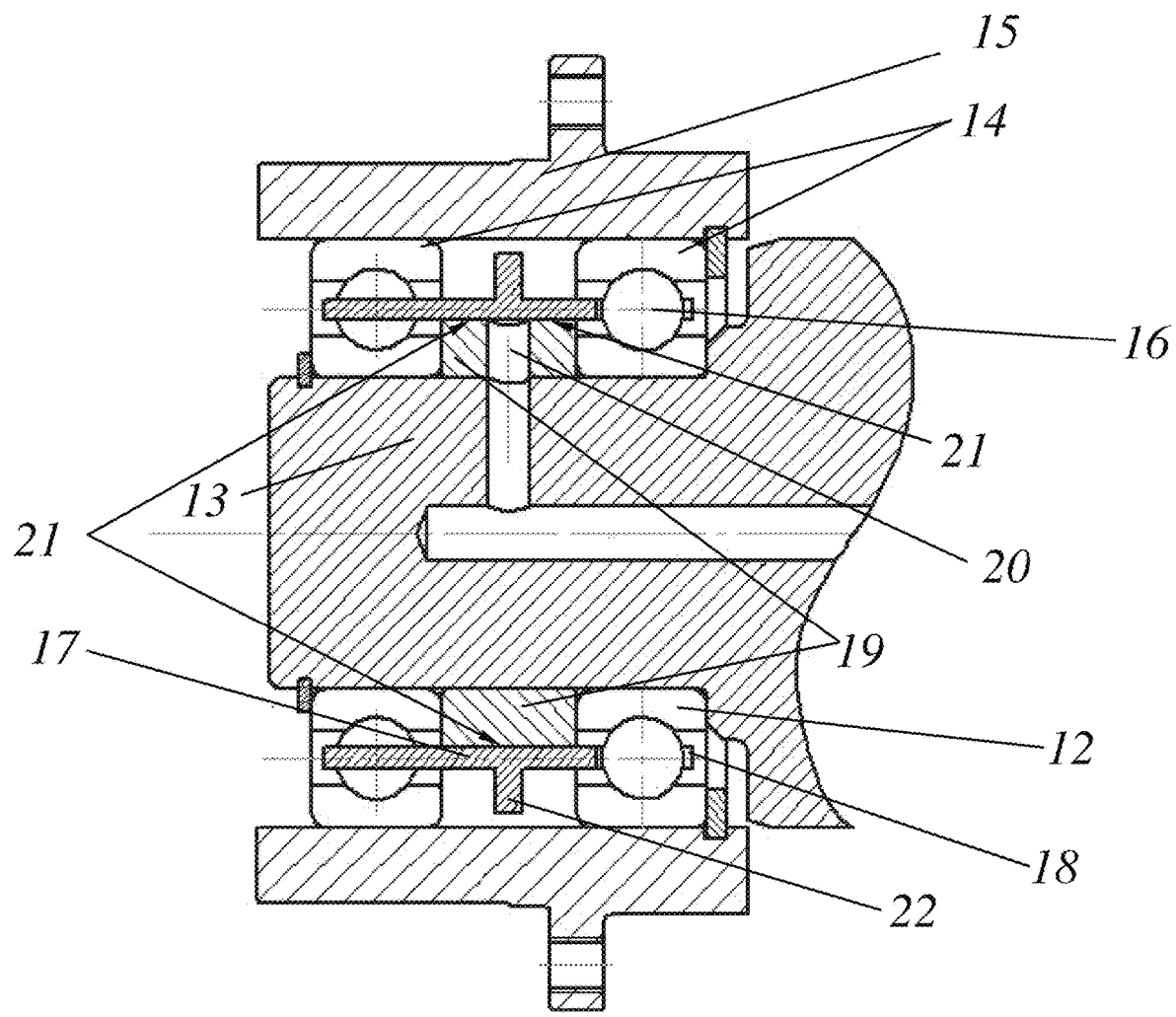

FIG. 4 presents another embodiment of the assembly differing from that shown in FIG. 1 by the location of the fixed supporting centering sleeve. The bearing assembly according to FIG. 4 incorporates two rolling bearings, each comprising an inner ring 12 mounted on a shaft 13, an outer ring 14 fixed in a case 15, and rolling elements 16 between the rings 12 and 14. The bearing assembly also comprises a toothed cage 17 made in the form of a hollow cylinder extending beyond an axial dimension of the bearing and having sockets 18 on the sides thereof in direct contact with the rolling elements 16. The cage is supported by fixed supporting centering sleeve (represented in FIG. 4 by a tubular member 19 thereof) made, or mounted, on the shaft 13 or made, or mounted, in the case 15, depending on the bearing assembly operation. As illustrated by FIG. 4, the fixed supporting centering sleeve is located inside of the extended hollow cylinder part of the cage 17. To supply oil to operating parts, the assembly is provided with channels 20 made in the tubular member 19 of the fixed supporting centering sleeve. Provided between the cage 17 and the fixed supporting centering sleeve is a clearance 21 where the oil supplied through the channels 20 is delivered. To improve the reliability of the design, reinforcement ribs 22 can be made on a portion of the cage cylinder, which is not in contact with the fixed supporting centering sleeve.

Figure 2:
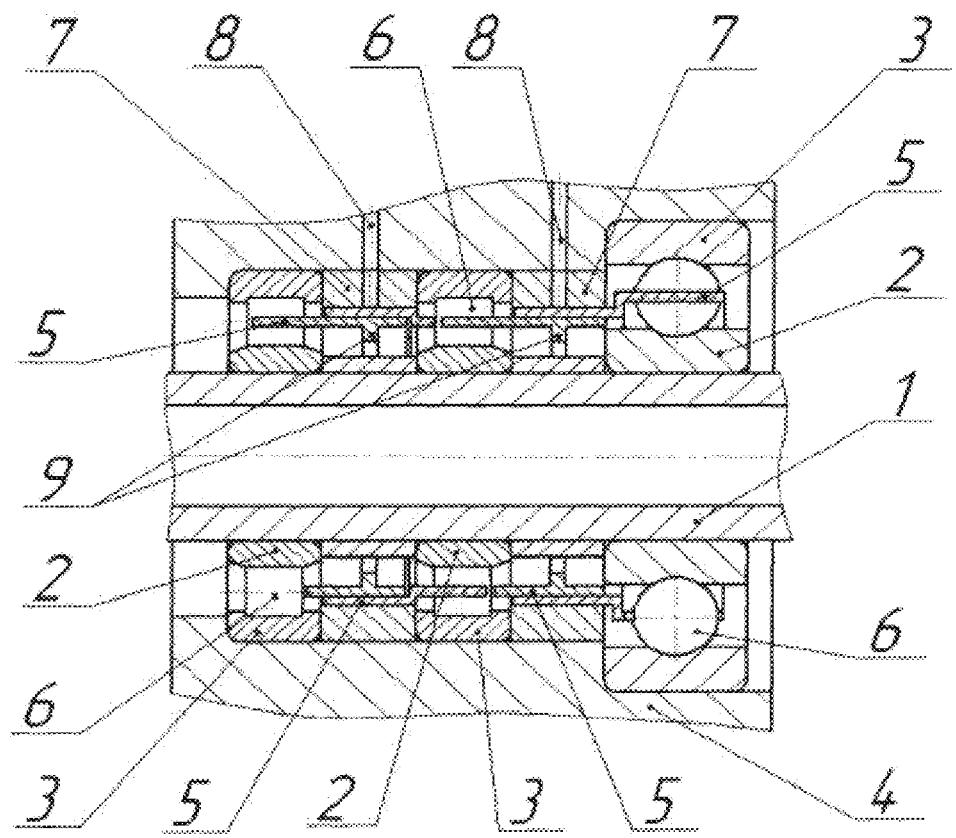

FIG. 2 shows an option of the bearing assembly, where the extended cylindrical part of the cage between the adjacent bearings is made up of two parts, coaxially inserted into each other, with the necessary clearance to provide slippage relative to each other.

Unlike the solid cage, the made-up design of the cage enables elimination of the rigid coupling between the bearings, operating in different conditions, and prevention of the negative effect of the difference in the slippage velocity of the rolling elements, particularly at high rotational speeds of the bearings.

The bearing assembly operates as follows:

In the process of the assembly operation, shaft 1, through inner rings 2, or case 4, through outer rings 3, transmit the rotation to rolling elements 6, which in turn rotate cylindrical cage 5. The cage rotates at a speed that is lower than the rotational speed of shaft 1.

In the process of the assembly operation, lubrication oil is supplied under pressure through channel 8 into the clearance between fixed supporting sleeve 7 and extended cylindrical part of the cage. As a result, oil films occur on the inner or outer surface of the cage, which unload the cage from the effect of significant centrifugal forces and eliminate the braking effect of the cage on the rolling elements and consequently reduce their mutual wear and increase the service life of the bearing assembly in general.

Slippage of the cage components (FIG. 2) relative to each other enables them to rotate at different speeds, which allows the use of rolling bearings of different types and types in a bearing assembly and, when same bearings are used, the reduction in the negative effect of the slippage of the rolling elements in the bearing races and the improvement in the operational reliability of the assembly.

Cylindrical components of the cage can have a varying diameter, where the diameter of the outer edge, equipped with the sockets in the form of a crown for rolling elements, is defined by the size of the bearings used (FIG. 2).

Figure 3:
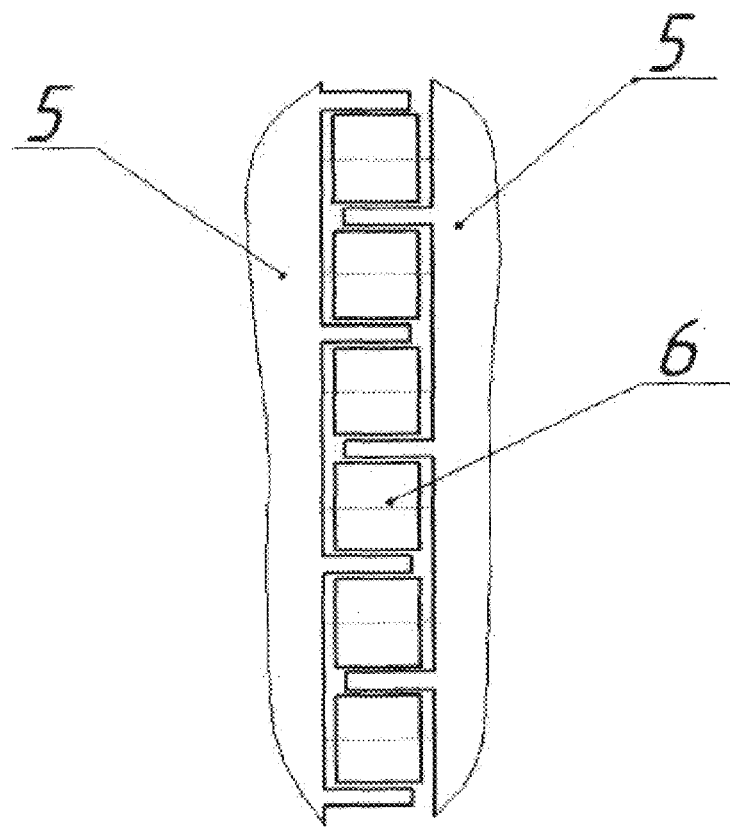

When using more than two bearings in a bearing assembly (FIG. 3), the rolling elements of the bearing, located between two outermost bearings, can be separated by two toothed cages disposed on both sides of such bearing, wherein some rolling elements of such bearing will be located in one toothed cage and other rolling elements of such bearing will be located in another toothed cage.

The proposed technical solution can find a common use in the machines and gears utilizing bearing assemblies incorporating at least two bearings, including those of different types and sizes, which operate at high speeds and are subject to high centrifugal forces exceeding the gravity acceleration by hundred times.

REFERENCES

1. Inventor's certificate of the USSR No. 1328595 dd. Jun. 13, 1984.
2. Inventor's certificate of the USSR No. 176468 dd. Mar. 20, 1963.

What is claimed is:

1. A bearing assembly comprising:
   at least two separate rolling bearings,
   a toothed cage made as a hollow cylindrical body which is coaxial to the bearing assembly and comprises sockets on both sides of the cylindrical body for accommodating rolling elements, and
   a fixed supporting centering sleeve,
   an axial dimension of the cage exceeding an axial dimension of at least one separate rolling bearing of the at least two separate rolling bearings and being sufficient for accommodating the rolling elements of the at least two separate rolling bearings in the sockets on both sides of the cage, and
   the fixed supporting centering sleeve being located inside of the cage, being provided with channels for supplying oil, being located between the at least two separate rolling bearings, and a clearance being provided between the cage and the fixed supporting centering sleeve to receive the oil supplied through the channels.

2. The bearing assembly according to claim 1, wherein a reinforcing rib is made on the cylindrical body of the toothed cage where the cylindrical body is not in contact with the supporting centering sleeve.

3. A bearing assembly comprising:
   at least two separate rolling bearings,
   a toothed cage made as a hollow cylindrical body which is coaxial to the bearing assembly and comprises sockets on both sides of the cylindrical body for accommodating rolling elements, and
   a fixed supporting centering sleeve,
   an axial dimension of the cage exceeding an axial dimension of at least one separate rolling bearing of the at least two separate rolling bearings and being sufficient for accommodating the rolling elements of the at least two separate rolling bearings in the sockets on both sides of the cage, and
   the fixed supporting centering sleeve being located outside of the cage, being provided with channels for supplying oil, being located between the at least two separate rolling bearings, and a clearance being provided between the cage and the fixed supporting centering sleeve to receive the oil supplied through the channels.

4. The bearing assembly according to claim 3, wherein a reinforcing rib is made on the cylindrical body of the toothed cage where the cylindrical body is not in contact with the supporting centering sleeve.

* * * * *